Oct. 16, 1928.
F. C. D. WILKES ET AL
1,688,137
SEPARATOR PLOW FOR CANE HARVESTERS AND THE LIKE
Filed July 15, 1919
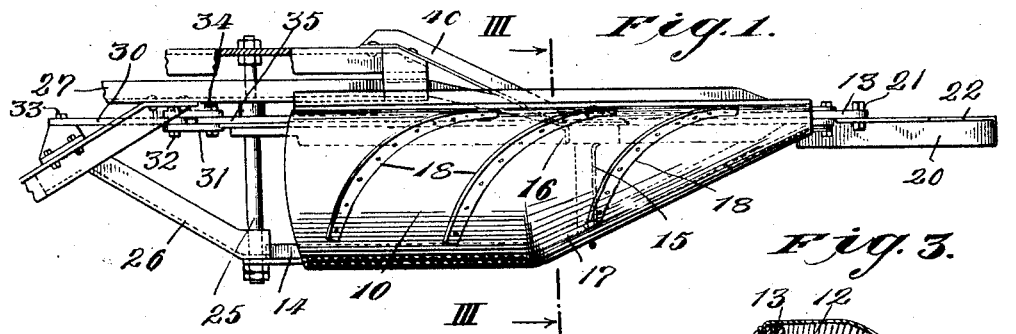
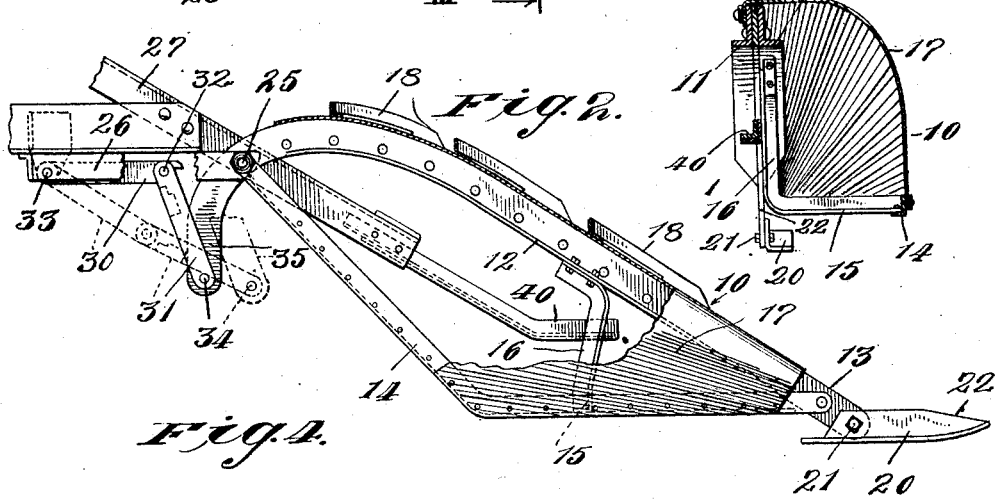
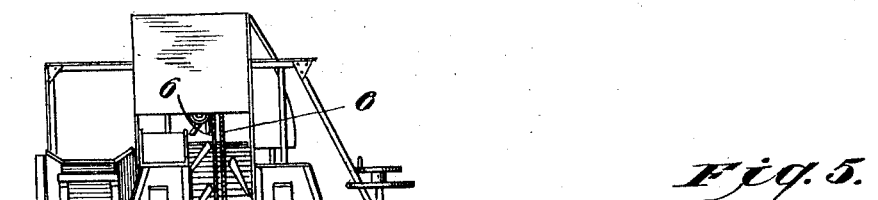
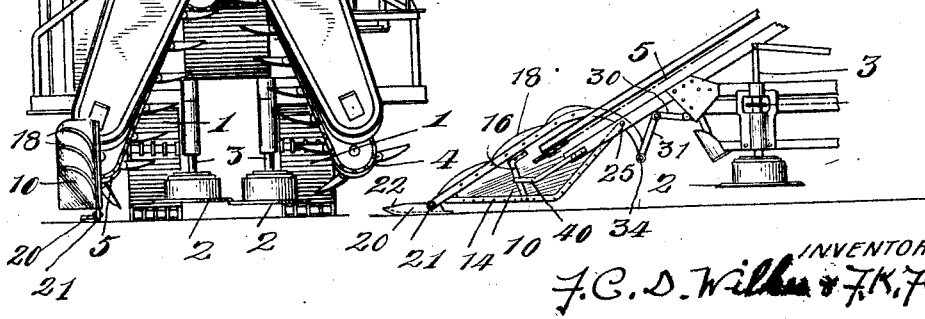

Patented Oct. 16, 1928.

1,688,137

UNITED STATES PATENT OFFICE.

FREDERICK C. DOUGLAS WILKES AND FRANCIS K. FLYNN, OF WATERTOWN, WISCONSIN, ASSIGNORS, BY MESNE ASSIGNMENTS, TO LUCE CANE HARVESTER CORPORATION, OF NEW YORK, N. Y., A CORPORATION OF DELAWARE.

SEPARATOR PLOW FOR CANE HARVESTERS AND THE LIKE.

Application filed July 15, 1919. Serial No. 310,956.

In the operation of cane harvesters which are designed to travel along a row of cane, cutting the cane in such row and passing it through the machine, difficulty is often experienced from the fact that the cane does not grow straight and even. On the contrary the cane is commonly crooked and leaning, with the result that the cane in one row frequently becomes tangled more or less with the cane in an adjacent row and with the trash lying on the ground, which in some districts is permitted to accumulate to a considerable depth. The present invention relates to means for facilitating the operation of a cane harvester or similar apparatus by lifting up the bent or fallen cane of the row being operated upon, so that it may be properly fed into the machine, and disentangling such cane from the cane in the adjacent uncut row or from trash or vegetable growths. The invention comprises an improved construction of separating device or plow for accomplishing the lifting up of the leaning and fallen cane of the row to be operated upon and separating the same from the cane in the adjacent row, and also to combinations of such means with the cane feeding and cutting devices of the harvester.

In the accompanying drawings in which we have illustrated a construction embodying one preferred form of the invention, Figure 1 is a plan view of the separator plow and its connections with the harvester frame;

Figure 2 is a side view of the same, a part of the sheathing of the plow being broken away;

Figure 3 is a transverse section on line 3—3 of Figure 1;

Figure 4 is a diagrammatic front view on a small scale showing a cane harvester having the improved plow applied thereto;

Figure 5 is a longitudinal sectional view through the front part of the machine shown in Figure 4 showing the plow applied thereto.

The present invention is applicable to cane harvesters and similar devices of various types, but for purposes of illustration we have shown the same as applied to a harvester of general character set forth in United States Letters Patent to George D. Luce, No. 1,053,917, the particular construction of harvester illustrated in Figures 4 and 5 being disclosed and claimed in the application for patent of George D. Luce filed May 12, 1919, Serial No. 296,539.

Referring to the drawings in detail, the harvester shown in Figures 4 and 5 is adapted to be traversed along a row of sugar cane, it being mounted for this purpose upon caterpillar tractor treads 1, which travel along the "middles" between the adjacent rows of cane. The cane is severed adjacent to or slightly below the surface of the ground by horizontal positively driven disc cutters 2 which are mounted upon rotatable and vertically adjustable shafts 3. The cane is straightened up and guided into the machine and to the cutters as the machine advances, by pick-up chains 4 and 5, the active stretches of which flare out toward the front as shown in Figure 4, so as to form a wide mouth or throat for gathering in the cane and straightening up the leaning stalks. The cane after being severed at the bottom by the cutters 2, is seized by conveyor chains 6 which carry it upwardly and rearwardly through the machine to the stripping and topping devices. While the diverging forward portions of the pick-up chains 4 and 5 will receive and straighten up and properly guide into the machine cane leaning to a considerable inclination, stalks which have fallen over too far and particularly stalks which have become entangled with the cane of the adjacent uncut row will not be properly brought into the machine, and in order to raise up and disentangle such stalks, we provide at the side of the machine which travels adjacent to the uncut row, the separator device or plow 10. This plow is preferably mounted for free up and down movement with reference to the machine, and is provided with a shoe or guiding support adapted to follow the surface of the ground so as to maintain the plow always at proper elevation. Means are also preferably provided for holding the plow in an elevated position when not in use. The plow should also be so formed as to properly enter under the fallen cane and lift and separate the same from the cane of the adjacent row and at the same time aid to clear itself from trash so as not to become clogged in operation.

In the particular construction illustrated in the drawings the plow comprises a strong metal framework including an upper brace built up of the angle irons 11 and 12 and the plate 13 which are firmly riveted together, the lower brace comprising the angle iron 14 and a cross brace 15 having an upright portion 16 providing a vertical guide surface for a purpose to be explained. The plow is provided with a sheathing 17 of heavy sheet metal attached to the upper and lower braces, as clearly shown in Figure 3, this sheathing being preferably given an outwardly and a downwardly curved shape in cross section and tapering in a sort of conical or pyramidal form so as to have a generally convex plow surface having a pointed forward end. Upon the outside of the sheathing are preferably secured one or more diagonally placed ribs 18, the purpose of which is to assist the plow in clearing itself of trash, these ribs being extended somewhat down the curved side of the sheathing so as to guide the trash picked up by the plow over to the outside of the plow and away from the row of cane being operated upon. These ribs prevent the trash from becoming piled up on the plow so as to interfere with the proper operation thereof. In the construction shown the plow is provided at its front end with a shoe 20 of angular cross section, as shown in Figure 3, and is pivoted at 21 to the forwardly projecting end of the upper brace of the plow. We find it preferable to employ a shoe having a long point at its front end tapered both from below and above as we find that a shoe of this character will travel closely along the surface of the ground without digging in. The upper tapered surface 22 causes the shoe to pass under the mat of trash which is often found in the field so that the shoe travels along the ground under this trash. At its rear end the plow is pivotally supported upon the frame of the harvester by the supporting pivot 25. This pivot is mounted in the frame bars 26 and 27 of the harvester frame and passes through holes in the upper and lower braces of the plow, the lower brace being inclined upwardly toward the rear as clearly shown in Figure 2. When in use the plow pivots freely on this pivot 25, its position being determined by the contour of the ground over which the shoe 20 is sliding. Suitable means are also provided for holding the plow in elevated position, this means, in the construction shown, taking the form of toggle links 30 and 31 pivoted together at 32, the other end of the link 30 being pivoted to a bracket on the frame as indicated at 33 and the outer end of the link 31 being pivoted at 34 to the downwardly turned arm 35, constituting a continuation of the upper brace member of the plow. When the toggle is broken, as shown in full lines in Figure 2, it does not interfere with the up and down movement of the plow, but when the plow is elevated and the toggle brought into the dotted line position of Figure 2, then it acts as a strut so as to maintain the plow raised. As the plow travels along in operation the greatest strain is directed thereon from the side towards the uncut row of cane, that is, from the side covered with the tapered sheath 17. In order to brace the plow against lateral displacement, means are preferably provided which, in the construction illustrated, comprise a bracket 40 attached to the frame of the harvester, forming a guide surface, against which the side of the member 16 is adapted to bear as shown in Figures 1, 2 and 3.

In operation, as the harvester travels along the cane row, the separator plow is propelled in advance of the machine. The shoe 20 traveling along the surface of the ground under the trash mat follows the irregularities of the ground surface and maintains the plow always at the proper elevation. The plow divides the trash mat throwing the bulk of the trash over towards the uncut row of cane and away from the row which is being operated upon, the ribs 18 preventing the trash from piling up on the plow so as to clog the same. The plow also lifts up leaning cane and cane which has become entangled with the cane in the adjacent row or with the trash or vegetable growths and straightens up the cane in the row to be cut sufficiently to permit it to be engaged by the pick-up chains. The plow also assists in straightening up or pushing away leaning cane in the adjacent row so as to keep it from being caught in the pick-up chains.

While we have illustrated in detail one preferred embodiment of the invention it will be understood that modifications may be made therein, and we do not desire therefore, to limit ourselves to the specific construction shown and described, but intend to cover our invention broadly in whatever form its principle may be embodied.

Having thus described our invention, we claim:

1. In aparatus of the character described, the combination with a cane harvester or the like including forwardly extending pick-up chains, of a separator plow mounted at one side of and in advance of the pick-up chains for free pivotal movement in a vertical plane, and means for maintaining the forward end of said plow adjacent to the ground surface irrespective of any irregularities thereof, said plow having a substantially straight inside surface and an outwardly and rearwardly diverging outside surface.

2. In apparatus of the character described the combination with a cane harvester or the like including a pair of laterally spaced, forwardly extending diverging pick-up chains adapted to receive the cane of a row between them, of a separator plow mounted at that side of the harvester adapted to travel adjacent to the uncut row of cane so as to separate the cane in the row being cut from the cane in the adjacent row, the inside surface of said plow lying in a plane substantially parallel with the longitudinal axis of the harvester.

3. In apparatus of the character described the combination with a cane harvester or the like, of a separator plow having a pivotal connection with the harvester permitting up and down movement of the plow, and means independent of said pivotal connection for supporting the plow against inward lateral displacement.

4. In apparatus of the character described the combination with a cane harvester or the like, of a plow having pivotal connection therewith for up and down movement, an abutment on the harvester, and means on the plow forming a vertical guiding surface adapted to engage said abutment.

5. In apparatus of the character described, the combination with a cane harvester or the like, of a separator plow mounted at the forward end of the harvester and adapted to travel adjacent the uncut row of cane, and a shoe carried by the forward end of said plow and adapted to follow the surface of the ground beneath any trash on the latter.

6. In apparatus of the character described, the combination with a cane harvester or the like, of a separator plow mounted at the forward end of the harvester and arranged for vertical movement, and a shoe carried by the forward end of said plow and adapted to follow the surface of the ground beneath any trash on the latter.

7. In apparatus of the character described, the combination with a cane harvester or the like, of a separator plow mounted at the forward end of the harvester and adapted to travel adjacent the uncut row of cane, and a shoe pivotally supported at the forward end of said plow and adapted to follow the surface of the ground beneath any trash on the latter.

8. In apparatus of the character described, the combination with a cane harvester or the like, of a separator plow pivotally supported near its rear end and mounted at the forward end of the harvester so as to travel adjacent the uncut row of cane, and a shoe carried by and supporting the forward end of said plow and adapted to follow the surface of the ground beneath any trash on the latter.

9. In apparatus of the character described, the combination with a cane harvester or the like, of a separator plow movably mounted at the forward end of the harvester, and a shoe carried by and supporting the forward end of said plow and adapted to follow the surface of the ground beneath any trash on the latter.

10. A separator plow having a ground-engaging shoe pivoted to the front thereof, said shoe having a forwardly extending pointed portion both the upper and lower surfaces of which are tapered towards the front.

11. A separator plow having a ground-engaging shoe provided with a portion forming a substantially horizontal ground-engaging surface and with a vertical rib portion, said rib portion being pivoted to the forward end of said separator plow.

12. In a separator plow the combination of a support, a plow pivoted thereto for free vertical movement within normal limits of operation, and automatically operating means for supporting said plow in an inoperative raised position when it is raised to a certain height.

13. In a separator plow the combination of a support, a plow pivoted thereto for up and down movement, and a toggle operatively connected to said support and to said plow for holding said plow in elevated position.

14. A separator plow having a framework including an upper metal bar inclined upwardly and rearwardly and having its rear end curved downwardly, and having a sheet metal housing attached to said framework and constituting the plow surface.

15. A separator plow comprising a framework including an upper metal bar inclined upwardly and rearwardly and downwardly curved at its rear end, a sheet metal housing attached to said framework and constituting the plow surface, and a ground-engaging shoe pivoted to the lower front end of said upper frame member.

16. A separator plow of the character described having a skeleton framework and a sheet metal housing attached thereto forming a convex outside plow surface, said sheet metal member being formed to approach a point at the forward end and flaring upwardly and laterally at its outside towards the rear.

17. A separator plow of the character described having a convex plow surface at one side therof, the upper portion of which is inclined upwardly and towards the rear and the side portion of which flares laterally towards the rear for a part of its length, the remainder of said portion extending substantially parallel with the longitudinal axis of the plow.

18. A separator plow of the character described having an upwardly sloping and laterally diverging convex plow surface provided with diagonal projecting guide ribs.

19. A separator plow of the character described having a convex plow surface with convex ribs thereon.

20. In a cane harvester or the like, the combination of cutters located near the ground, a pair of laterally spaced, and forwardly and downwardly extending and diverging pick-up chains adapted to gather in and straighten up the cane and guide it to said cutters, and a ground engaging separator plow mounted adjacent the forwardly extending end of one of said diverging pick-up chains and adapted to travel between the row of cane which is being cut and the adjacent row of cane and serving to raise and disentangle the cane in said rows.

F. C. DOUGLAS WILKES.
FRANCIS K. FLYNN.